United States Patent [19]

Shedigian

[11] Patent Number: 4,459,637
[45] Date of Patent: Jul. 10, 1984

[54] DIELECTRIC FLUID FOR A CAPACITOR

[75] Inventor: Vandos Shedigian, Indianapolis, Ind.

[73] Assignee: Emhart Industries, Inc., Indianapolis, Ind.

[21] Appl. No.: 499,258

[22] Filed: May 31, 1983

[51] Int. Cl.³ .................... H01G 3/175; H01G 4/22
[52] U.S. Cl. ................... 361/327; 252/567; 361/311; 361/323
[58] Field of Search .................. 361/311–315, 361/318, 323, 327; 252/567, 570, 575, 578, 579

[56] References Cited

U.S. PATENT DOCUMENTS

| 3,342,654 | 9/1967 | Golonka et al. | 361/323 X |
| 3,761,772 | 9/1973 | Suzuki et al. | 361/313 X |
| 4,293,433 | 10/1981 | Borror et al. | 361/327 X |
| 4,381,535 | 4/1983 | Shedigian et al. | 252/567 X |

FOREIGN PATENT DOCUMENTS

| 2042196 | 3/1971 | Fed. Rep. of Germany | 252/578 |
| 1000247 | 8/1965 | United Kingdom | 361/323 |

Primary Examiner—Donald A. Griffin
Attorney, Agent, or Firm—Robert F. Meyer

[57] ABSTRACT

In a capacitor, a dielectric provides zero to about 10 weight percent of an antioxidant and glyceryl triacetate. The capacitor body includes metallized polypropylene film forming the electrodes and a separating dielectric. Air is excluded from the capacitor body during construction and dielectric fluid is prevented from impregnating the body and from imbibing into the polypropylene film by the characteristics of the glyceryl triacetate. By means of this construction, disruptive electrical or corona discharges and their harmful effects are reduced.

5 Claims, 4 Drawing Figures

DIELECTRIC FLUID FOR A CAPACITOR

BACKGROUND OF THE INVENTION

1. Field of the Invention

The present invention generally relates to a dielectric fluids for capacitors and, in particular, to such fluids that are used in capacitors having metallized electrodes formed on plastic film.

2. Statement of the Prior Art

Metallized plastic film capacitors which are used under high stress conditions generally suffer from failures due to electrical or corona discharges between the metallized electrodes. As these discharges cannot be prevented, it is desirable to avoid their harmful effects to thereby improve the operating life of the capacitors. Generally, metallized film capacitors have the advantage of being "self-healing." This means that corona discharges between the electrodes causes part of the electrode to be oxidized or burnt away thereby increasing inter-electrode spacing to thereby stop the arcing. The presence of either air or dielectric liquids between the electrodes only increases the incidences of arcing and generates harmful by-products which further speed degredation of the capacitor. Degradation is also caused by erosion of the electrodes resulting in loss of capacitance. Also, swelling of the polypropylene film by various dielectric liquids causes a loss in the electrical strength of the polypropylene film thus increasing the amount of inter-electrode arcing. For these reasons, it is generally desirable to exclude both air and dielectric fluid from the capacitor roll of metallized plastic film capacitors and to reduce the amount of imbibtion of the dielectric liquid into the plastic film.

It is known generally that air may be excluded from a plastic film capacitor roll by using biaxially oriented polypropylene film which is wound tightly onto a hard core and heated to elevated temperatures for a given period of time. The heat treatment causes shrinkage predominantely in the roll wound direction, resulting in the elimination of air pockets from the roll. Although this process does appear to eliminate the presence of air, it does not necessarily exclude dielectric fluid from entering the capacitor roll. Again, this dielectric liquid may be absorbed into the polypropylene film to reduce its electrical strength and cause undesirable by-products in the case of an electrical discharge taking place in the presence of the liquid. For this reason, means are needed to prevent impregnation of the roll by dielectric fluid and also to prevent imbibtion of the dielectric fluid into the plastic film.

SUMMARY OF THE INVENTION

Accordingly, the present invention resides in a capacitor, wherein a dielectric fluid comprises zero to about 10 weight percent of an antioxidant or mixtures of antioxidants and glyceryl triacetate. In another form, the present invention includes a capacitor comprising a housing, a pair of convolutely wound metallized film electrodes enclosed wthin the housing, and a dielectric liquid excluding gases from the housing and including glyceryl triacetate and zero to about 10 weight percent of an antioxidant.

BRIEF DESCRIPTION OF THE DRAWINGS

The present invention is illustratively shown and described in respect to the accompanying drawings in which.

DETAILED DESCRIPTION OF THE DRAWINGS

Figure 1:
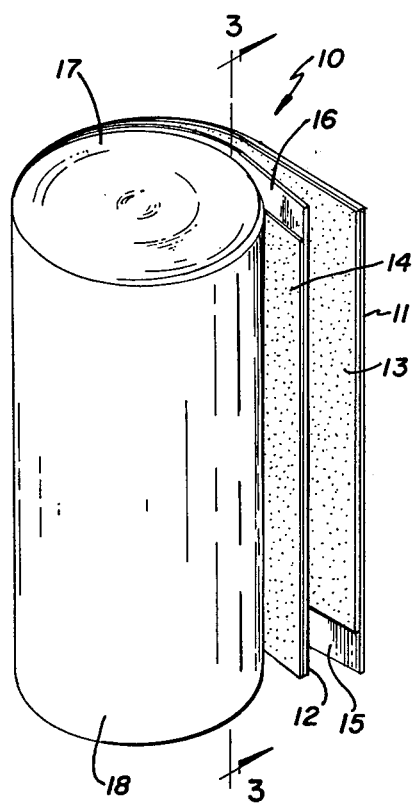
FIG. 1 is a perspective view of a convolutely wound metallized film capacitor body which is partially unwound to show the dielectric plastic film and metallized foil electrode structure.

Referring now to FIG. 1, there is illustrated a convolutely wound ac capacitor body 10. The capacitor body 10 includes a pair of dielectric plastic film layers 11 and 12 and overlying metallized electrodes 13 and 14, respectively. The dielectric plastic film layers 11 and 12 are metallized in such a manner as to provide margins 15 and 16 which are free of metal. Such margins are useful in helping to prevent electrical short circuits between the metallized electrodes at the ends of the capacitor body 10. In convolutely winding the capacitor body 10, the metallized electrode 13 overlying the plastic film 11 is laterally offset with respect to metallized electrode 14 overlying the plastic film 12 so that metallized electrode 13 and margin 16 appear at end 17 of the capacitor body and so that metallized electrode 14 and margin 15 appear at end 18 of the capacitor body.

Figure 2:
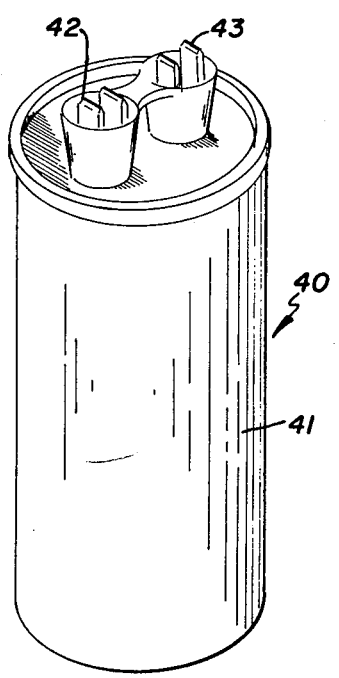
FIG. 2 is a perspective view of the capacitor body of FIG. 1 to which terminal leads are attached.

As shown in FIG. 2, suitable terminal leads 19 and 20 are attached to the ends 17 and 18, respectively, of the capacitor body 10 using any suitable attachment process. The attachment process must not result in electrically conductive material penetrating into the capacitor body 10 to cause the metallized electrode at the capacitor body edge to electrically short the other metallized electrode. An acceptable attachment process includes spraying the ends 17 and 18 of the capacitor body 10 with lead, a lead alloy, aluminum, an aluminum alloy, zinc, a zinc alloy, tin, a tin alloy, nickel, a nickel alloy and the like. The metal material at the ends of the capacitor body 10 are indicated by the reference numerals 21 and 22. Lead strips 23 and 24 are suitably attached to the metal material as shown in FIG. 2. A suitable lead strip material is solder coated copper.

Figure 3:
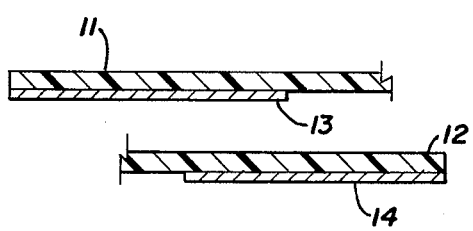
FIG. 3 is a partial sectional view taken across lines 3—3 of FIG. 1.

FIG. 3 is a sectional view taken along the line 3—3 of FIG. 1 but limited to a small section of the capacitor body 10. In FIG. 3, the plastic film layers 11 and 12 and their respective overlying metallized electrodes 13 and 14 are arranged in the same manner as shown in FIG. 1.

Metallized electrode 13 is integrally joined to the plastic film 11 whereas metallized electrode 14 is integrally joined to the plastic film 12. FIG. 3 shows a metallized electrode on but one side of the plastic film; however, the metallized electrode layers may be deposited on both sides of the plastic film. FIG. 3 shows a single side of the plastic film as being metallized. The application of the metallized electrodes 13 and 14 to their respective plastic film may be accomplished by any suitable process such as vapor, chemical or other known metal desposition processes. For example, aluminum can be deposited over the dielectric layer to have a resistivity of about 1 to about 4 ohms per square inch. Depending on the specific operating characteristics desired, the resistivity of each metallized electrode can be more than 4 ohms per square inch or less than 1 ohm per square inch. Generally speaking, a capacitor with high resistivity, metallized electrodes tends to suffer a decrease in its capacitance more readily than does a capacitor with lower resistivity electrodes. On the other hand, a capacitor with low resistivity metallized electrodes may not clear or self-heal. The low resistivity metallized electrode capacitor would tend to fail if the dielectric plastic film suffers a breakdown, since the thicker metallized layer would require more energy to produce vaporization of the electrodes around any such breakdown site. Metals other than aluminum may be used as the metallized electrodes provided they do not disintegrate dielectric plastic film and have the desired resistivity. Such other metals include nickel, zinc, tin and the like.

The dielectric plastic films or layers 11 and 12 should have high dielectric strength, low dissipation factor to prevent thermal runaway, broad temperature range capabilities, resistance to the dielectric fluid, and freedom from pinholes and conductive particles. The dielectric film layers 11 and 12 may be any suitable homogenous polymer or plastic material such as polyester, polyethylene, polycarbonate, polystyrene, polysulfone, polyethylene terephthalate and, preferably, the polyolefins, particularly polypropylene. Polyester is not as desirable as polypropylene because in a-c capacitors it tends to generate too much heat at desired operating voltage stresses. The upper operating temperature of polyethylene is much lower than that of polypropylene. Polycarbonate, polystyrene and polysulfone are not as solvent resistant as a polypropylene.

The presently most preferred polypropylene is biaxially oriented polypropylene for it tends to meet all desirable specifications. Biaxially oriented polypropylene is preferred because it permits an a-c capacitor to operate at high KVAR (kilovolt-ampere reactive) per unit volume due to its high dielectric strength and low dissipation factor and it imbibes little, if any, of the dielectric fluid of this invention.

Figure 4:
FIG. 4 is a perspective view of the capacitor body of FIGS. 1 and 2 enclosed in a suitable housing.

In FIG. 4, a capacitor body 10 is preferably sealed in a can or housing 40 to form a capacitor 41. Capacitor 41 includes the metal housing or can 40 and terminals 42 and 43. The capacitor body 10 is contained within the housing 40 and terminal lead 23 makes electrical contact with terminal 42 and the remaining terminal lead 24 makes electrical contact with terminal 43.

The dielectric liquid of this invention has little or no tendency to permeate plastic film such as polypropylene, has high electrical strength, is easily purifiable, maintains its good electrical properties at high operating temperatures, and has low volitility and toxicity.

The dielectric liquid of the present invention fills the housing 40 to exclude air and other gasses therefrom. The liquid includes glyceryl triacetate and zero to about 10 weight percent of an antioxidant. Glyceryl triacetate is available from the Eastman Kodak Company as KODAFLEX Triacetin.

An antioxidant is included in the dielectric liquid to help keep the dissipation factor of the liquid lower for a longer period of time. The preferred amount of antioxidant is about 0.01 to about 10 wt. percent of the total weight of the dielectric fluid. The antioxidant may include phenols such as phenolic and di-tert-butyl-p-cresol. Other antioxidants known in the art which do not significantly increase the dissipation factor of the dielectric fluid may also be used. Mixtures of antioxidants are also contemplated.

Glyceryl triacetate has two significant characteristics which significantly improve upon the operating performance of high stress metallized film a-c capacitors as herein discussed. These characteristics are very little penetration of the dielectric liquid into the capacitor roll and very little imbibtion of the dielectric liquid into the plastic film. The low impregnation is caused by a relatively high contact angle for the fluid on the polypropylene plastic film which may also be described as a very low wetability of the film by the liquid. This lack of impregnation prevents the liquid from being present in the event of corona discharges and avoids the resulting generation of gasses and performance damaging ions. The low imbibtion of the liquid into the plastic film prevents weakening of the plastic film by swelling thereof and further avoids the presence of the liquid on the sites of harmful corona discharges.

Tests were done to determine the wetability and swellability of polypropylene film by both glyceryl triacetate and the currently used dioctylphthalate (hereinafter DOP) with the following results.

| Wetability - Contact Angle (in degrees) @ 25° C. | | | |
| --- | --- | --- | --- |
| Glyceryl triacetate | | 39° | |
| DOP | | 16° | |
| Swellability (in percent) | 25° C. | 60° C. | 95° C. |
| Glyceryl triacetate | 0.05 | 0.35 | 0.60 |
| DOP | 0.40 | 4.0 | 7.1 |

As indicated by the results, the contact angle for glyceryl triacetate is more than twice that of DOP which means that glyceryl triacetate has a much lower wetability of polypropylene film than does DOP. Further, the swellability of polypropylene film for glyceryl triacetate is much lower than for DOP. In fact, the glyceryl triacetate appears to imbibe into the polypropylene film by a factor of ten times less than DOP. These performance figures greatly reduce any intrusion of the dielectric liquid into the capacitor roll and thereby prevent the deleterious results therefrom.

During manufacturing, the capacitor body 10 of FIG. 1 is constructed by tightly winding the metallized polypropylene film on a hard roll to stretch the film in the roll wound direction. Terminal strips 23 and 24 are attached and the capacitor body 10 is enclosed in the housing 40. The capacitor is then heat treated in a vacuum for a period of time to cause the shrinkage of the polypropylene film in the roll wound direction and the resulting removal of air from the roll. Prior to this, the dielectric liquid described above has been prepared and refined by passing it through a Fuller's earth column and likewise heating it in a vacuum to help remove dissolved gasses. The heated liquid is then introduced into the capacitor 41 while still under vacuum condition to promote displacement of every possible bit of gas from the housing 41 by the dielectric liquid. After the capacitor has cooled, the hole may be easily sealed with solder.

The advantages of glyceryl triacetate over DOP were compared by thusly constructing two sets of capacitors rated at 440 VAC at 15 u F. These capacitors included a polypropylene film thickness of 0.4 mils with one set of capacitors filled with glyceryl triacetate and the other set of capacitors filled with DOP. The capacitors were placed on a life test under 550 VAC of stress for 2,000 hours at 80° C. The results were that the capacitors filled with glyceryl triacetate experienced an average capacitance loss of 2.7% while the capacitors filled with DOP experienced an average capacitance of loss of 5.8%. The greater capacitance loss for the DOP capacitors is directly attributable to greater swelling of the polypropylene film by the DOP and to the greater impregnation of DOP into the capacitor body 10. These factors increase inter-electrode arcing and also the amount of by-products generated thereby.

Thusly, it can be been that the use of glyceryl triacetate as the dielectric liquid reduces the amount of inter-electrode arcing experienced by metallized plastic film capacitors and thus reduces the amount of electrode erosion caused thereby. As demonstrated, this increases capacitor life and performance.

The above descriptions of the embodiments of the present invention are intended to be taken in an illustrative and not a limiting sense. Various modifications and changes may be made to these embodiments by persons skilled in the art without departing from the scope of the present invention as defined by the appended claims.

What is claimed is:

1. In a capacitor, a dielectric fluid comprising glyceryl triacetate and 0 to about 10 wt. percent of an antioxidant or mixtures of antioxidants.

2. The dielectric fluid of claim 1, wherein said antioxidant is a phenolic antioxidant and is included from 0.01 to about 10 wt. percent and said glyceryl triacetate is included from 90 to about 99.99 wt. percent.

3. A capacitor, comprising:
   a housing;
   a pair of convolutely wound metallized film electrodes enclosed within said housing; and
   a dielectric liquid excluding gasses from said housing and including glyceryl triacetate and 0 to about 10 wt. percent of an antioxidant.

4. The capacitor of claim 3, wherein said metallized film electrodes are formed on a plastic film selected from the group consisting of polypropylene, polyester, polycarbonate, polystyrene, polysulfone and polyethylene terphthalate.

5. The capacitor of claim 4, wherein the plastic film is biaxially oriented polypropylene.

* * * * *